US011410029B2

(12) United States Patent
Fukuda et al.

(10) Patent No.: US 11,410,029 B2
(45) Date of Patent: Aug. 9, 2022

(54) SOFT LABEL GENERATION FOR KNOWLEDGE DISTILLATION

(71) Applicant: INTERNATIONAL BUSINESS MACHINES CORPORATION, Armonk, NY (US)

(72) Inventors: Takashi Fukuda, Kanagawa-ken (JP); Samuel Thomas, Elmsford, NY (US); Bhuvana Ramabhadran, Mount Kisco, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 988 days.

(21) Appl. No.: 15/860,097

(22) Filed: Jan. 2, 2018

(65) Prior Publication Data
US 2019/0205748 A1    Jul. 4, 2019

(51) Int. Cl.
*G06N 3/08* (2006.01)

(52) U.S. Cl.
CPC .................... *G06N 3/08* (2013.01)

(58) Field of Classification Search
None
See application file for complete search history.

(56) References Cited

U.S. PATENT DOCUMENTS

2017/0011738 A1* 1/2017 Senior .................. G10L 15/063

OTHER PUBLICATIONS

Shi, Mengnan; Qin, Fei; Ye, Qixiang; Han, Zhenjun; Jiao, Jianbin. A Scalable Convolutional Neural Network for Task-Specified Scenarios Via Knowledge Distillation. 2017. IEEE (Year: 2017).*

Milos Cernak, Alexandros Lazaridis, Afsaneh Asaei, Philip N. Garner. Composition of Deep and Spiking Neural Networks for Very Low Bit Rate Speech Coding. 2016. IEEE (Year: 2016).*

Shinji Watanabe, Takaaki Hori, Jonathan Le Roux, and John R. Hershey. Student-Teacher Network Learning With Enhanced Features. 2017. IEEE. (Year: 2017).*

Eric Fosler-Lussier. Yanzhang He, Preethi Jyothi, and Rohit Prabhavalkar. Conditional Random Fields in Speech, Audio, and Language Processing. 2013. IEEE (Year: 2013).*

Cui, J. et al., "Knowledge Distillation Across Ensembles of Multilingual Models For Low-Resource Languages" 2017 IEEE International Conference on Acoustics, Speech and Signal Processing (ICASSP) (Mar. 2017) pp. 4825-4829.

(Continued)

*Primary Examiner* — Daniel T Pellett
(74) *Attorney, Agent, or Firm* — Tutunjian & Bitetto, P.C, Randall Bluestone

(57) ABSTRACT

A technique for generating soft labels for training is disclosed. A teacher model having a teacher side class set is prepared. A collection of class pairs for respective data units is obtained. Class pairs includes classes labelled to corresponding data units from the teacher side class set and a student side class set different from the teacher side class set. A training input is fed into the teacher model to obtain a set of outputs for the teacher side class set. A set of soft labels for the student side class set is calculated from the set of the outputs by using at least an output obtained for a class within a subset of the teacher side class set having relevance to the member of the student side class set, based at least in part on observations in the collection of the class pairs.

19 Claims, 10 Drawing Sheets

(56) References Cited

OTHER PUBLICATIONS

Hinton, G. et al., "Distilling the Knowledge in a Neural Network" arXiv:1503.02531(Mar. 2015) pp. 1-9.
Li, J. et al., "Large-Scale Domain Adaptation via Teacher-Student Learning" arXiv:1708.05466 (Aug. 2017) pp. 1-5.
Wang, D. et al., "Recurrent Neural Network Training with Dark Knowledge Transfer" arXiv:1505.04630v2 (May 2015) pp. 1-5.
Yu, D. et al., "Recent Progresses in Deep Learning Based Acoustic Models" IEEE/CAA Journal of Automatica Sinica (Jul. 2017) pp. 396-409, vol. 4, No. 3.

* cited by examiner

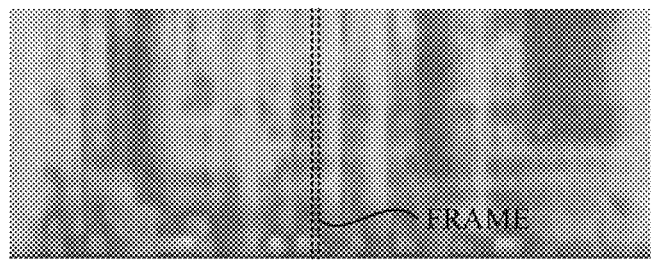

| TRANSCRIPTION (108b): | Ok That's all right |

| FORCED ALIGNMENT FOR STUDENT: | OW | K | EY | DH | AE | T | S | AO | L | R | AY | T |

SPEECH DATA(108a):

| FORCED ALIGNMENT FOR TEACHER: | OW | K | EY | DH | AE | T | S | AO | L | R | AY | T |

104a

| FRAME# | PHONEME CLASS FOR STUDENT | PHONEME CLASS FOR TEACHER |
|---|---|---|
| #1 | B-b-xx-x (i=yyy) | B-b-xx-x (j=yyy) |
| #2 | B-m-xx-x (i=yyy) | B-m-xx-x (j=yyy) |
| #3 | B-m-xx-x (i=yyy) | B-m-xx-x (j=yyy) |
| #4 | B-e-xx-x (i=yyy) | B-e-xx-x (j=yyy) |
| #5 | AH-b-xx-x (i=yyy) | AH-b-xx-x (j=yyy) |
| #6 | AH-b-xx-x (i=yyy) | AH-m-xx-x (j=yyy) |
| #7 | AH-m-xx-x (i=yyy) | AH-m-xx-x (j=yyy) |
| #8 | AH-e-xx-x (i=yyy) | AH-e-xx-x (j=yyy) |

SOFT LABEL GENERATION FOR KNOWLEDGE DISTILLATION

BACKGROUND

Technical Field

The present disclosure, generally, relates to machine learning, and more particularly, to methods, computer program products and computer systems for generating soft labels used for training a model.

Related Art

Knowledge distillation (also known as student-teacher training) techniques have recently been developed to make a product-level neural network (NN) for a variety of systems that may require a quick turnaround. In the framework of the knowledge distillation, a compact student model is trained by using soft labels obtained from powerful teachers, which may be usually too heavy to deploy as a practical service, using training criteria that minimize the differences in distributions between the student and teacher models.

In typical automatic speech recognition (ASR) systems, each component of output layers corresponds to a context-dependent phoneme class represented by a decision tree. The components of the output layers may be different depending on target environments. It is quite time-consuming to build models for each acoustic environment. For example, it takes a month or more to train a VGG model (developed by Visual Geometry Group (VGG) at the University of Oxford), an LSTM (Long Short-Term Memory) and a ResNet (Deep Residual Network) that can be used as one of teacher networks with product-level training data size.

SUMMARY

According to an embodiment of the present invention, a computer-implemented method for generating soft labels for training is provided. The method includes preparing a teacher model having a teacher side class set. The method also includes obtaining a collection of class pairs for respective data units, in which each class pair includes classes labelled to a corresponding data unit from among the teacher side class set and from among a student side class set that is different from the teacher side class set. The method further includes feeding a training input into the teacher model to obtain a set of outputs for the teacher side class set. The method includes further calculating a set of soft labels for the student side class set from the set of the outputs by using, for each member of the student side class set, at least an output obtained for a class within a subset of the teacher side class set having relevance to the member of the student side class set, based at least in part on observations in the collection of the class pairs.

Computer systems and computer program products relating to one or more aspects of the present invention are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

The subject matter, which is regarded as the invention, is particularly pointed out and distinctly claimed in the claims at the conclusion of the specification. The foregoing and other features and advantages of the invention are apparent from the following detailed description taken in conjunction with the accompanying drawings in which:

FIG. 3 describes a way of obtaining alignments between teacher and student side classes according to the exemplary embodiment of the present invention;

DETAILED DESCRIPTION

Now, the present invention will be described using particular embodiments, and the embodiments described hereafter are understood to be only referred to as examples and are not intended to limit the scope of the present invention.

One or more embodiments according to the present invention is directed to computer-implemented methods, computer systems and computer program products for generating soft labels, which can be used to train a student model, by using data obtained from a teacher model having a different target class set.

First, with reference to the series of FIGS. 1-7, a computer system and a method for generating soft labels that can be used to train a student model for speech recognition in a framework of knowledge distillation by using data that is obtained from a teacher model having a different class set of phonetic units according to exemplary embodiments of the present invention will be described. Then, with reference to the series of FIGS. 8 and 9, a computer system and a method for generating soft labels that can be used to train a student model for image recognition in a framework of knowledge distillation by using data that is obtained from a teacher model having a different image class set according to other exemplary embodiments of the present invention will be described.

Embodiment for Speech Recognition

Figure 1:
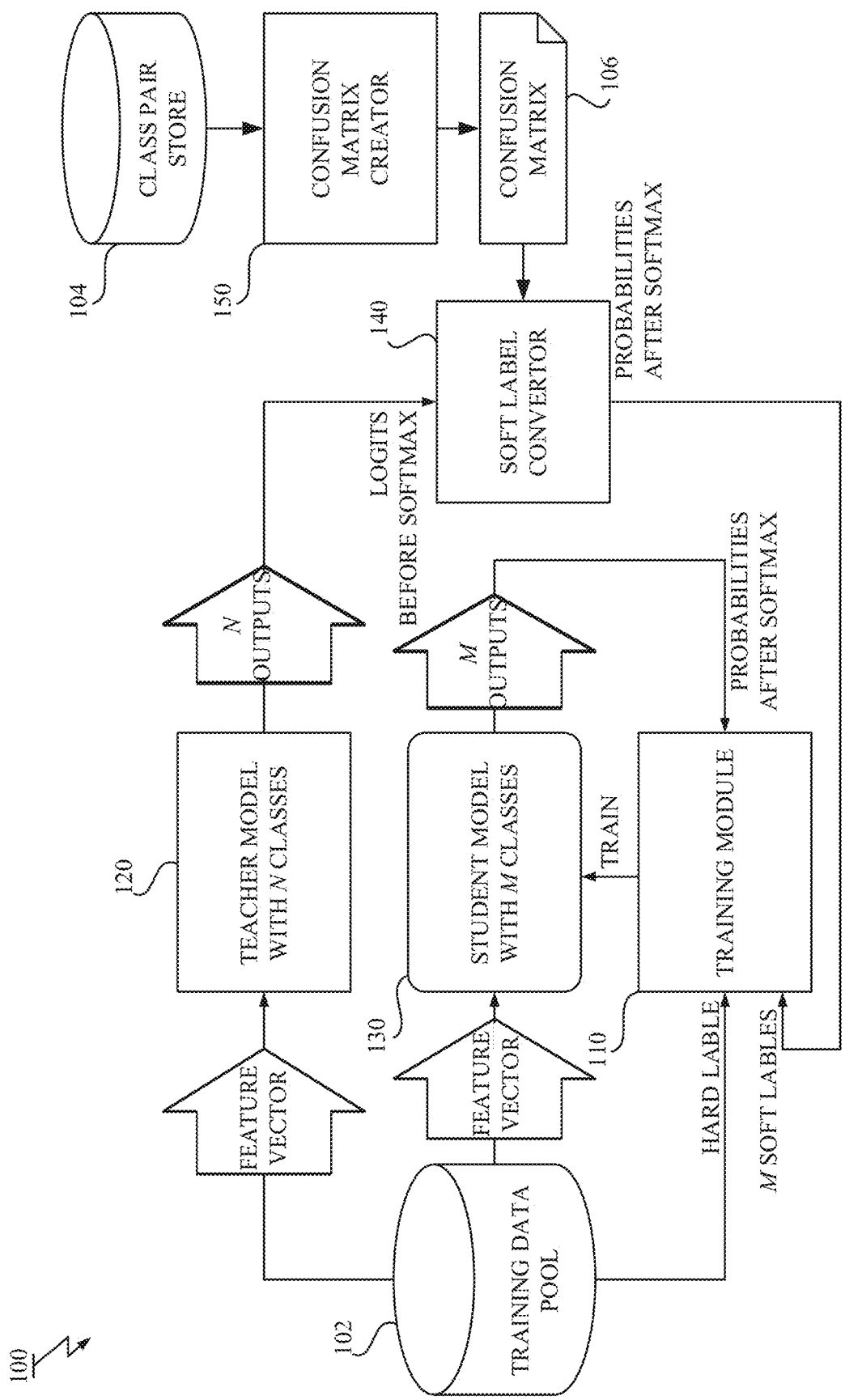
FIG. 1 illustrates a block diagram of a knowledge distillation system for speech recognition according to an exemplary embodiment of the present invention.

With reference to FIG. 1, a knowledge distillation system for speech recognition according to an exemplary embodiment of the present invention is described.

FIG. 1 illustrates a block diagram of a knowledge distillation system 100 for the speech recognition. As shown in FIG. 1, the knowledge distillation system 100 includes a training data pool 102 that stores a collection of training data; a training module 110 that performs a training process based on knowledge distillation technique; a teacher model 120 that produces data for generating soft labels for the knowledge distillation from training data stored in the training data pool 102; and a student model 130 under training by the training module 110.

In the speech recognition, a neural network (NN) model is typically used for an acoustic model to produce a probability distribution over HMM (Hidden Markov Model) states from acoustic features that are derived from a speech (audio) signal. The HMM states may correspond to clusters of context-dependent phoneme states, or simply context-independent phoneme states. One of the context dependent models is a quinphone model where each distinct phone model for every different two left and two right phone contexts is used.

There are, for example, 23 phonemes in Japanese. By considering phonemes before and after center phonemes with parameter sharing, there are totally thousands to several tens of thousands context-dependent phoneme states for typical speech recognition system. The neural network model for the acoustic model typically includes an input layer that receives acoustic features derived from a speech signal; one or more hidden layers that processes the acoustic features; and an output layer that outputs a probability distribution over HMM states based on activations of the hidden layers.

In the knowledge distillation system 100 shown in FIG. 1, the teacher model 120 has N (N is a positive integer) classes of context-dependent phonemes as the output layer, whereas the student model 130 has M (M is a positive integer) classes of context-dependent phonemes as the output layer. In the exemplary embodiment, the phonetic units are the context-dependent phoneme states. Hereinafter, a set of N phoneme classes for the teacher model 120 is referred to as a teacher side class set and a set of M phoneme classes for the student model 130 is referred to as a student side class set.

The teacher model 120 is typically a high resource classification model, which contains a single model or an ensemble of plural models. The teacher model 120 may even have resources that are too heavy to actually deploy as practical service. The single classification model or each classification model in the ensemble may be any one of standard neural networks, which includes DNN (Deep Neural Network), CNN (Convolutional Neural Network), RNN (Recurrent Neural Network) based models and a neural network model combining features of several neural network types. In a particular embodiment, the teacher model 120 includes, but not limited to, a VGG model, a LSTM and/or a ResNet. In the described embodiment, the teacher model 120 has already been trained using a sufficiently large collection of training data before the knowledge distillation.

The student model 130 is typically a lightweight compact classification model that can be easily used as a production acoustic model. The student model 130 may be any one of standard neural networks, which includes DNN, CNN, RNN based models and a neural network combining features of several neural network types. In one or more embodiments, the student model 130 has a different structure from the teacher model 120. In the exemplary embodiment, the student model 130 is smaller and simpler than the teacher model 120 (i.e., less parameters). However, a model larger and/or more complex than the teacher model 120 may not be excluded from the models for the student model 130.

The number of the members in the teacher side class set for the teacher model 120 may be larger than, equal to, or smaller than the number of the members in the student side class set for the student model 130. Even if the number of the members in the teacher side class set is same as the number of the members in the student side class set, the student side class set is different from the teacher side class set at least partially in members. Actual members of the teacher side class set and the student side class set depend on environments for the teacher model 120 and the student model 130, respectively. Note that, in the described embodiment, the members in the student side class set may belong to a phoneme system of a language same as the members in the teacher side class set.

The training module 110 is configured to train the student model 130 using the teacher model 120 in a framework of knowledge distillation. The knowledge distillation is a process of training the student model 130 by leveraging soft labels obtained from the teacher model 120 with/without a hard label given for training data. The student model 130 may not have been trained yet before the knowledge distillation and would be trained during the knowledge distillation. Alternatively, the student model 130 may have been trained to some extent in advance and would be additionally trained during the knowledge distillation. In further other embodiments, the knowledge distillation using the soft labels can be used as pre-training for the student model 130 to provide a better starting point, followed by a fine-tuning process.

Since the teacher model 120 has a different class set from the student model 130, the knowledge distillation system 100 shown in FIG. 1 further includes modules that can absorb such difference between the teacher and the student side class sets to avoid an condition that components of output layers between student and the teacher models are same, which may be implicitly assumed in standard knowledge distillation techniques.

As shown in FIG. 1, the knowledge distillation system 100 further includes a class pair store 104 that store a collection of data; a soft label convertor 140 for converting from outputs produced by the teacher model 120 into soft labels that can be used to train the student model 130; and a confusion matrix creator 150 for generating a confusion matrix 106, which can be used for soft label conversion, based on data stored in a class pair store 104.

The class pair store 104 is configured to store a collection of class pairs labelled to respective frames in speech data. In the exemplary embodiment, data unit is a frame in the speech data. The speech data collected to generate the class pairs may include any speech data that records actual utterances spoken in conversation, narration, etc. Each class pair may include a pair of phoneme classes that are aligned by forced alignment to a corresponding frame from among the teacher side class set and from among the student side class set. In the other word, each frame has been parallelly labeled in advance with a correct phoneme class that is selected from among the teacher side class set and a correct phoneme class that is selected from among the student side class set. The class pair store 104 is provided by a data storage or memory area of any storage medium or devices operably coupled to a processing unit that implements the confusion matrix creator 150.

The confusion matrix creator 150 is configured to create a confusion matrix 106 based on the collection of the parallelly labeled class pairs stored in the class pair store 104. The confusion matrix 106 is a data structure that summarizes, for each member of the student side class set, a distribution of observations over classes of the teacher side class set that are observed together with the corresponding member of the student side class set. The created confusion matrix 106 is stored on a data storage or memory area of any storage medium or devices operably coupled to a processing unit that implements the soft label convertor 140 and typically the confusion matrix creator 150, and is referenced by the soft label convertor 140 in calculating the soft labels.

Figure 2:
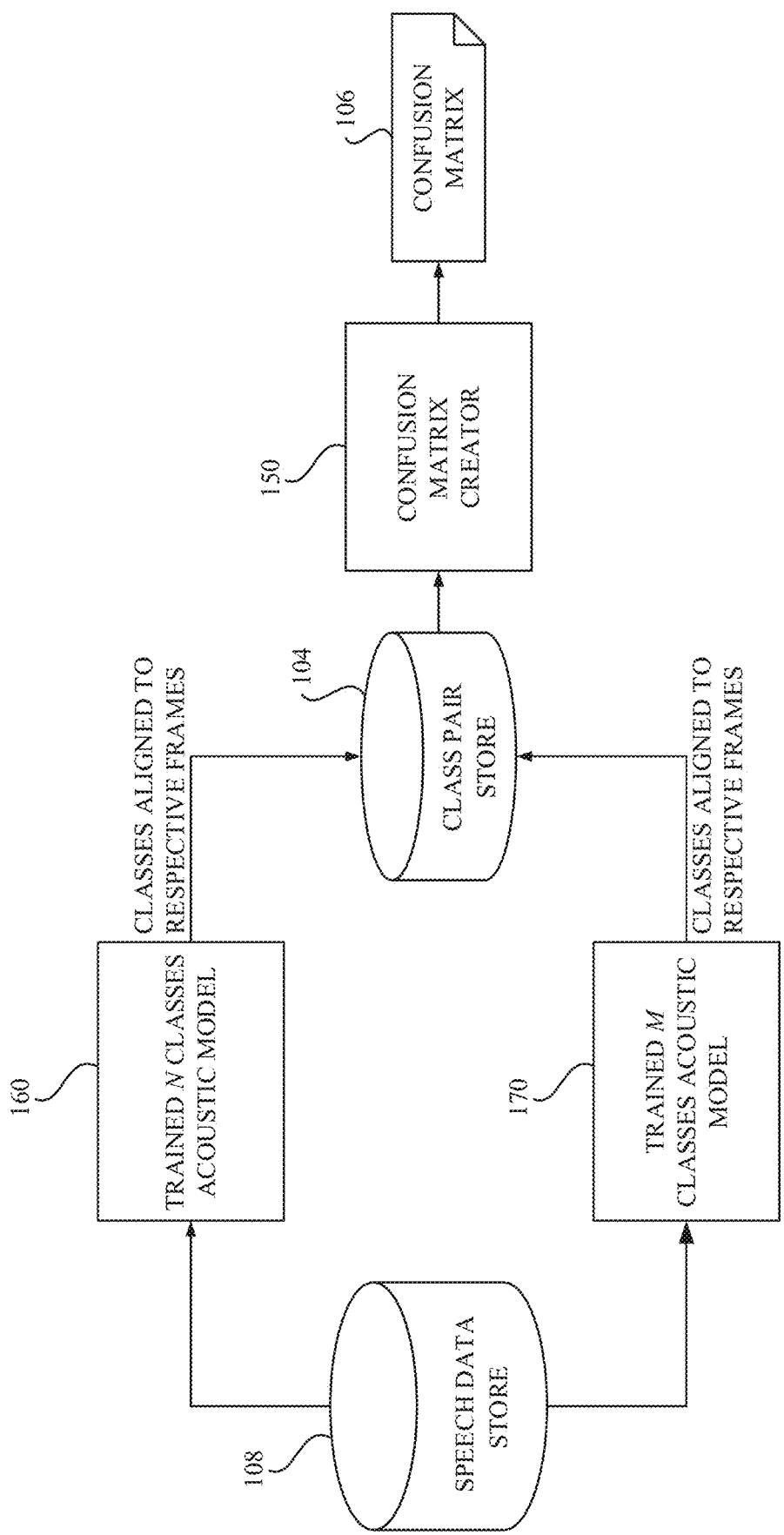
FIG. 2 depicts a more detailed block diagram around a confusion matrix generator in the knowledge distillation system according to the exemplary embodiment of the present invention.
Figure 4:
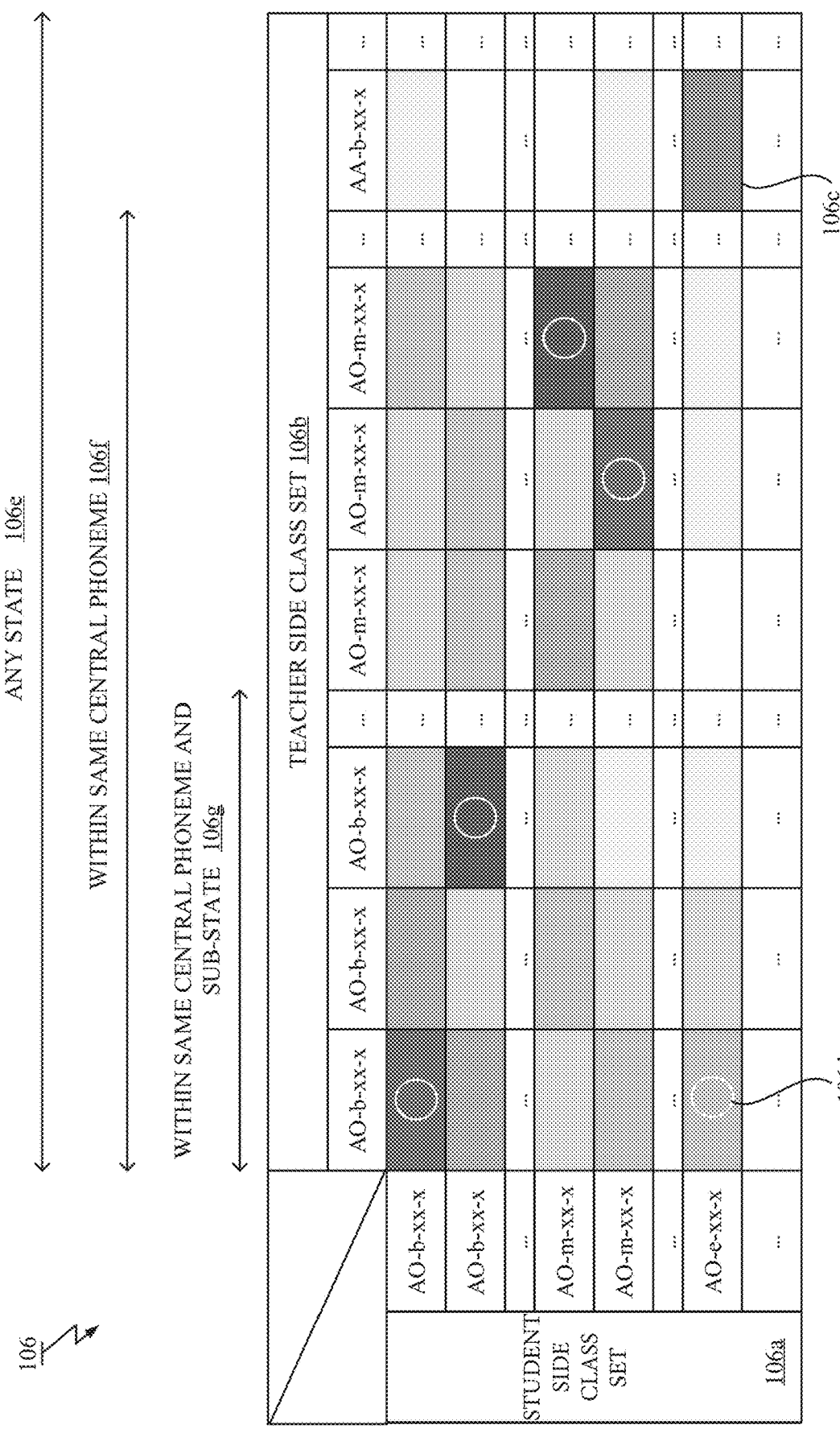
FIG. 4 illustrates a data structure of a confusion matrix used for label conversion in the knowledge distillation system according to the exemplary embodiment of the present invention.

With reference to FIGS. 2-4, a way of creating the confusion matrix 106 will be described in more detail. FIG. 2 depicts a more detailed block diagram around the confusion matrix creator 150 in the knowledge distillation system 100. As shown in FIG. 2, there are a trained N-class acoustic model 160 and a trained M-class acoustic model 170 in addition to the confusion matrix creator 150 shown in FIG. 1. Also, there is a speech data store 108.

The trained N-class acoustic model 160 is an acoustic model that has a class set same as the teacher side class set for the teacher model 120. In a particular embodiment, the teacher model 120 may be used as the trained N-class acoustic model 160. The purpose of using the trained N-class acoustic model 160 is to obtain alignments of phoneme classes to the respective frames in the speech data. Thus, alternatively, other model having a class set that is same as the teacher side class set may also be used as the trained N-class acoustic model 160, which may be any one of standard acoustic models including GMM (Gaussian Mixture Models)/HMM systems and NN/HMM systems.

The trained M-class acoustic model 170 is an acoustic model that has a class set same as the student side class set for the student model 130. The purpose of using the trained M-class acoustic model 170 is also to obtain alignments of phoneme classes to the respective frames in the speech data. Thus, any one of standard acoustic models including GMM/HMM system and NN/HMM system may be used as the trained M-class acoustic model 170.

The speech data store 108 shown in FIG. 2 may store a collection of speech data with respective transcriptions. The transcription is typically transcribed by human experts or automatic transcription software. Each speech data stored in the speech data store 108 may be provided in a form of a speech (audio) signal corresponding to an utterance.

The trained N-class acoustic model 160 is configured to align a phoneme class to each frame in the speech data from among the teacher side class set by a forced alignment technique with the transcription given for the speech data. The trained M-class acoustic model 170 is also configured to align a phoneme class to each frame in the speech data from among the student side class set by the forced alignment technique with the transcription. Appropriate feature extraction may be performed to derive a series of frames of acoustic features from the speech (audio) signal before the forced alignment.

FIG. 3 schematically illustrates a way of obtaining alignments between teacher and student side classes. As shown in FIG. 3, there are speech data 108a and a corresponding transcription 108b. Based on the transcription 108b, teacher side phoneme classes are aligned by the trained N-class acoustic model 160 to respective frames in the speech data 108a from among the teacher side class set. Also, student side phoneme classes are aligned by the trained M-class acoustic model 170 to respective frames in the speech data 108a from among the student side class set. Note that phonemes (e.g., "OW", "K", "EY", . . . ) are depicted to be aligned to respective segments in the speech data 108a in FIG. 3 for simplicity: However, the forced alignment may be performed at least at a level of the teacher side and a student side classes (e.g. quinphone) and a frame level. Also note that an example of the speech data 108a and an example of the transcription 108b shown in FIG. 3 are depicted for the purpose of schematic description and do not indicate accurate information.

As shown in FIG. 3, the collection 104a includes a frame number 104b identifying a corresponding frame; a class label 104c belonging to the student side class set; and a class label 104d belonging to the teacher side class set. The class label may be represented in a format related to a decision tree. In the example shown in FIG. 3, the class label (e.g., B-b-xx-x) includes a character representing a center phoneme (e.g., "B", "AH"), a character representing a sub-state ("b"/"m"/"e" that means a begin, middle or end interval) and a class number (e.g., xx-x). Also, each class label is associated with an index i (for the student side class set) or j (for the teacher side class set) identifying a corresponding class.

Referring back to FIG. 2, the confusion matrix creator 150 creates the confusion matrix 106 by counting observations where each member of the student side class set and each member of the teacher side class set are observed together in the collection stored in the class pair store 104.

FIG. 4 illustrates a data structure of the confusion matrix 106 used for label conversion in the knowledge distillation system 100. As shown in FIG. 4, each row of the confusion matrix 106 represents the members in the student side class set 106a while each column represents the members in the teacher side class set 106b. Each cell 106c holds a count or relative frequency (=count/total count within a row) of observations where corresponding teacher side and student side classes are labeled to the same frame. In FIG. 4, a tone of the cell 106c represents the count or the relative frequency of the observations. Darker tones mean a relatively high count or relative frequency whereas lighter tones mean a relatively low count or relative frequency.

The confusion matrix 106 shown in FIG. 4 summarizes a distribution of observations over classes of the teacher side class set (corresponding to columns) that are observed together with a member of the student side class set (corresponding to one row) in the collection of the parallelly labeled class pairs in the class pair store 104.

Referring back to FIG. 1, the components related to the process of the knowledge distillation will be described in more detailed.

The knowledge distillation system 100 controls flow of the knowledge distillation process. The knowledge distillation system 100 prepares the teacher model 120 having the teacher side class set that has been already trained. The knowledge distillation system 100 also prepares the student model 130 to be trained and the training data pool 102 to be used. Then, the knowledge distillation system 100 performs the process of the knowledge distillation to train the student model 130 by cooperating the training module 110, the teacher model 120 and the soft label convertor 140 with training data stored in the training data pool 102.

The training data pool 102 is configured to store a collection of training data, each of which includes a training input and a hard label. The training input may be a feature vector containing a sequence of acoustic features with a predetermined number of frames. The hard label given for each training input may indicates one of the student side class set aligned to the central frame of the feature vector by standard forced alignment technique as similar to the way of obtaining the alignments between the teacher and student side classes. The training data stored in the training data pool 102 may originate from the speech data used for generating the collection of the aligned class pairs or other speech data.

In one or more embodiments, the acoustic features may include, but not limited to, MFCC (Mel Frequency Cepstral Coefficient), LPC (Linear Predictive Coding) Coefficient, PLP (Perceptual Liner Prediction) Cepstral Coefficient, log Mel spectrum, raw input features, or any combinations thereof. The acoustic features may further include dynamical features such as delta features and delta-delta features of the aforementioned acoustic features.

A training input retrieved from the training data pool 102 is fed into the teacher model 120 to produce a set of outputs for the teacher side class set. The obtained set of the outputs for the teacher side class set is then fed into the soft label convertor 140 to convert into a set of soft labels for the student side class set.

The soft label convertor 140 is configured to calculate a set of soft labels for the student side class set from the set of the outputs obtained from the teacher model 120 by using the confusion matrix 106, which is created based at least in part on observations in the collection of the class pair store 104. For each member of the student side class set, the soft label convertor 140 finds an appropriate class within a subset of the teacher side class set that has relevance to the corresponding member of the student side class set based on the confusion matrix 106, and uses at least an output obtained for the found class to calculate a soft label for the corresponding member of the student side class set.

In a preferable embodiment, the soft label convertor 140 uses an output obtained for a teacher side class that is frequently observed in the collection together with the corresponding student side member. In a further preferable embodiment, a most frequently observed class is mapped to the corresponding student side member, and the output for this teacher side class is used for calculating a soft label for the corresponding student side member by using softmax function. However, in other embodiments, multiple outputs corresponding to multiple teacher side classes that are frequently observed in the collection together with the corresponding student side member may be used for calculating the soft label by weighted or unweighted average.

The class used to calculate a soft label for each student side member may be selected from among the subset of the teacher side class set that has relevance to the member of the student side class set. In the speech recognition, the relevance may mean sharing the same central phoneme and/or the same sub-state.

Referring back to FIG. 4, mapping pairs between the student and teacher side classes are also depicted. In FIG. 4, the circle 106*d* given for each row (i.e., each student side class) represents a mapped teacher side class having the highest count or frequency within certain limitation. A mapping pair between teacher and student side classes is determined by checking highest count within the subset of the teacher side class set in the confusion matrix 106.

In a particular embodiment, a condition 106*f* that limits to a subset sharing the same central phoneme may be employed. Thus, the subset of the teacher side class set for one student side member includes one or more classes having a center phoneme same as the corresponding student side member. In the example shown in FIG. 4, even though the teacher side class "AA-b-xx-x" not sharing the central phoneme with a student side class "AO-e-xx-x" has a higher count, the teacher side class "AO-b-xx-x" sharing the central phoneme is selected as indicated by the circle 106*d*. In other particular embodiment, a condition 106*g* that limits to a subset sharing both the same central phoneme and the same sub-state (e.g. "b"/"m"/"e" that means a begin, middle or end interval) may be employed.

Note that, in the described embodiment, it is assumed that the classes in the student side class set belongs to a phoneme system of a language that is same as that of the teacher side class set.

Note that it is described that the confusion matrix 106 includes cells corresponding to all members of the teacher side class set for each row. However, in other embodiment, if the limitation for the subset is fixed in advance, the confusion matrix creator 150 is not necessary to count observations where each class in the complement of the subset of the teacher side class set is observed together with each corresponding student side member. Thus, the confusion matrix 106 may holds observations in the collection over at least classes of the subset of the teacher side class set for each member of the student side class set.

Referring back to FIG. 1, the training input is fed into the teacher model 120 for each training data in the training data pool 102. Then, a set of soft labels for the student side class set is calculated for each training data based on the outputs from the teacher model 120. Thus, a collection of training examples, each of which includes a feature vector, a hard label and soft labels, is prepared for training.

In the described embodiment, the outputs obtained from the teacher model 120 are logits or activations before softmax computation. The soft labels calculated by the soft label convertor 140 for the student side class set are posterior probabilities after the softmax computation, thus, that are called as 'soft' labels since the class identities are not as deterministic as the original one hot hard label.

After obtaining sufficient amount of the training examples, the training module 110 initiates training of the student model 130 having the student side class set using at least a part of the soft labels calculated for each training data. In the described embodiment, during the knowledge distillation process, the hard label and the soft labels are used alternately to update parameters of the student model 130. When using the soft labels, training criteria that minimize the differences in distributions between the student and teacher models are used. The cross entropy criteria may be employed.

However, the training criteria as well as way of using the soft labels in the training may not be limited to the aforementioned examples. The soft labels can be used in a various criteria and ways to train the student model 130. In other particular embodiment, a weighted average of two different cost functions, including cross entropy with the hard labels and cross entropy with the soft labels, which plays a role of regularization, may be employed. In further other particular embodiment, the student model 130 is trained with merely soft labels and then refined with hard labels, in which the training process using the soft labels plays a role of pre-training, and supervised training process with hard labels plays a role of fine-tuning. In another particular embodiment, training criteria that directly minimize the divergence (Kullback-Leibler divergence, a.k.a. relative entropy) between the output distribution of the student model and the teacher model may also be contemplated.

In the knowledge distillation, at least soft labels calculated by feeding the feature vector into the teacher model 120 are used. Although the hard label given for each training data can be used to improve the performance of the student model, the hard label is not necessary to be used for training the student model 130. Thus, in other embodiment, unlabeled training data may be used to train the student model 130.

The student model 130 finally obtained after the training performed by the training module 110 can be used for an acoustic model. In a particular embodiment, the acoustic model may be a hybrid NN (Neural Network)-HMM model, where the neural network is used to directly compute observation probability distribution over HMM states instead of a standard Gaussian Mixture Models (GMM) in the GMM/HMM system. However, the acoustic model is not limited to the aforementioned hybrid NN-HMM model. In other embodiment, the acoustic model may be other type of NN-HMM model that is based on tandem or "bottleneck feature" approach, where the neural network is used to extract features as input for a subsequent system such as a standard GMM/HMM system, NN/GMM/HMM system and other neural network based system having different architecture or structure from the neural network, in place of or in addition to standard acoustic features.

In particular embodiments, each of modules 110, 120, 130, 140 and 150 of the knowledge distillation system 100 described in FIG. 1 as well as each of modules 160 and 170 in the block diagram shown in FIG. 2 may be, but not limited to, implemented as a software module including program instructions and/or data structures in conjunction with hardware components such as a processing circuitry (e.g., CPU (Central Processing Unit), GPU (Graphic Processing Unit), FPGA (Field Programmable Gate Array)), a memory, etc.; as a hardware module including electronic circuitry (e.g., neuromorphic chip); or as a combination thereof. These modules 110, 120, 130, 140, 150, 160 and 170 described in FIG. 1 and FIG. 2 may be implemented on a single computer system such as a personal computer and a server machine or a computer system distributed over a plurality of computing devices such as a computer cluster of the computing devices.

Note that the teacher model 120 is not necessary to be located on a local of a computer system that implements other modules of the knowledge distillation system 100. It is sufficient if the teacher model 120 is available through a network. Thus, preparing the teacher model 120 means making the teacher model 120 available by reading the teacher model 120 onto a memory space of the local computer system; or establishing a connection with the teacher model 120 that operates on a remote computer system such that the training input can be fed into the teacher model 120 and a result for the training input can be received from the teacher model 120.

Figure 5:
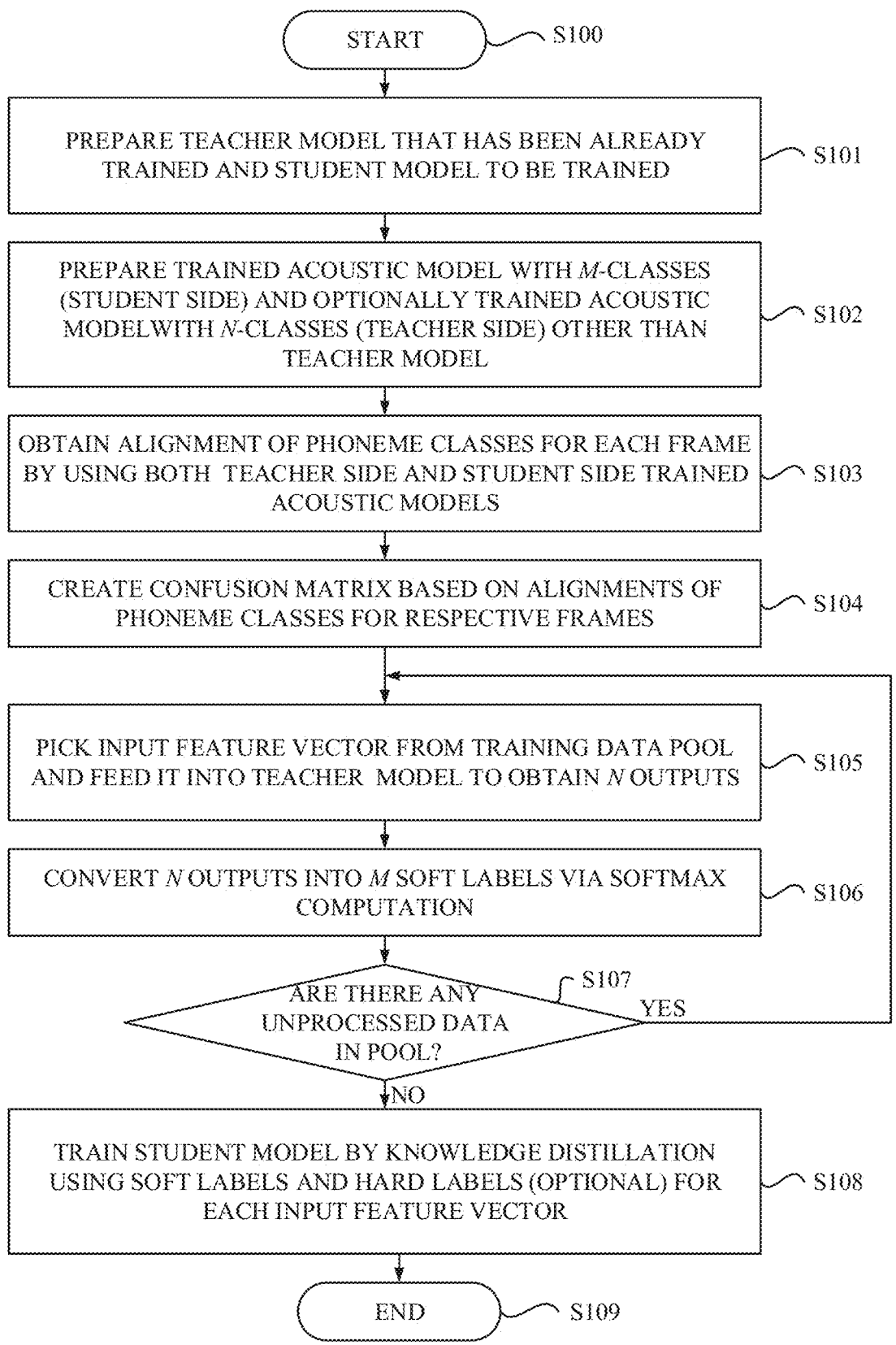
FIG. 5 is a flowchart depicting a knowledge distillation process for training a neural network for an acoustic model according to the exemplary embodiment of the present invention.

With reference to FIG. 5, a flowchart depicting a knowledge distillation process for training a neural network for an acoustic model is depicted. As shown in FIG. 5, the process may begin at step S100 in response to receiving, from an operator, a request for initiating a knowledge distillation process. A teacher model 120, a student model 130, a collection of training data, a collection of speech data and trained acoustic models for phoneme alignments may be designated in the request. Note that the process shown in FIG. 5 may be performed by processing circuitry such as one or more processing units.

At step S101, the processing circuitry may prepare a teacher model 120 that has been already trained and a student model 130 to be trained. The teacher model 120 prepared at the step S101 has a teacher side class set, which may be determined by the configuration of the teacher model 120. The student model 130 prepared at the step S101 has a student side class set, which may be designated in the request by the operator. Let i ($\in$I) be an index of a class used for the student model 130 where I represents the student side class set. Let j$\in$J be an index of a class used for the teacher model 120 where J represents the teacher side class set.

At step S102, the processing circuitry may further prepare a trained M-class acoustic model 170 that has the class set as same as the student model 130 and optionally a trained N-class acoustic model 160 that has the class set as same as the teacher side class set when a model other than the teacher model 120 is used for the forced alignment.

At step S103, the processing circuitry may obtain alignments of phoneme classes for each frame. The process at step S103 may include a sub-step for aligning a phoneme class to each data unit from among the student side class set by using the trained M-class acoustic model 170. The process at step S103 may further include a sub-step for aligning a phoneme class to each data unit from among the teacher side class set by using the teacher model 120 or the trained N-class acoustic model 160. The process at step 103 estimates a phoneme class i in the student side class set I and a phoneme class j in the teacher side class set J for each frame in the speech data. By the process at the step S103, a collection of parallelly labeled class pairs for respective frames may be obtained.

At step S104, the processing circuitry may create a confusion matrix 106 based on the alignments of the phoneme classes for the respective frames. Since it has been described with reference to FIGS. 2-4, a detailed description about the way of creating the confusion matrix 106 is omitted here.

At step S105, the processing circuitry may pick a feature vector from the training data pool 102 and feed the vector into the teacher model 120 to obtain a set of outputs $y_j$ for the teacher side class set J. The outputs $y_j$ (j=1, ..., N) obtained at the step S105 may be logits or activations before the softmax computation.

At step S106, the processing circuitry may calculate a set of soft labels $q_i$ for the student side class set I from the set of the outputs $y_j$ for the teacher side class set J. The soft labels $q_i$ (i=1, ..., M) calculated at the step S106 may be probabilities after the softmax computation. Conversion from the outputs $y_j$ (j=1, ..., N) into the soft label $q_i$ (i=1, ..., M) is performed by using a softmax function as follows:

$$q_i = \frac{\exp\left\{y_{\underset{j \in J_i}{\mathrm{argmax}\, m(i,j)}} / T\right\}}{\sum_{k \in I} \exp\left\{y_{\underset{j \in J_k}{\mathrm{argmax}\, m(k,j)}} / T\right\}},$$

where m (i, j) represents a count or relative frequency of a cell designated by the indices i, j in the confusion matrix 106, T is a temperature parameter and $J_i$ is a subset of the teacher side class set J that has relevance to the corresponding member i of the student side class set I, e.g., a subset of classes sharing the same center phoneme as the member i. The process at the step S106 creates class mapping pairs with the highest counts or relative frequencies in the confusion matrix 160 within the subset $J_i$ having relevance to the member i. The temperature parameter controls the softness of the probability distribution over classes. A higher value for the temperature parameter forced the softmax function to produce softer provability distribution. In a particular embodiment, the temperature may be set to 1.

Figure 6:
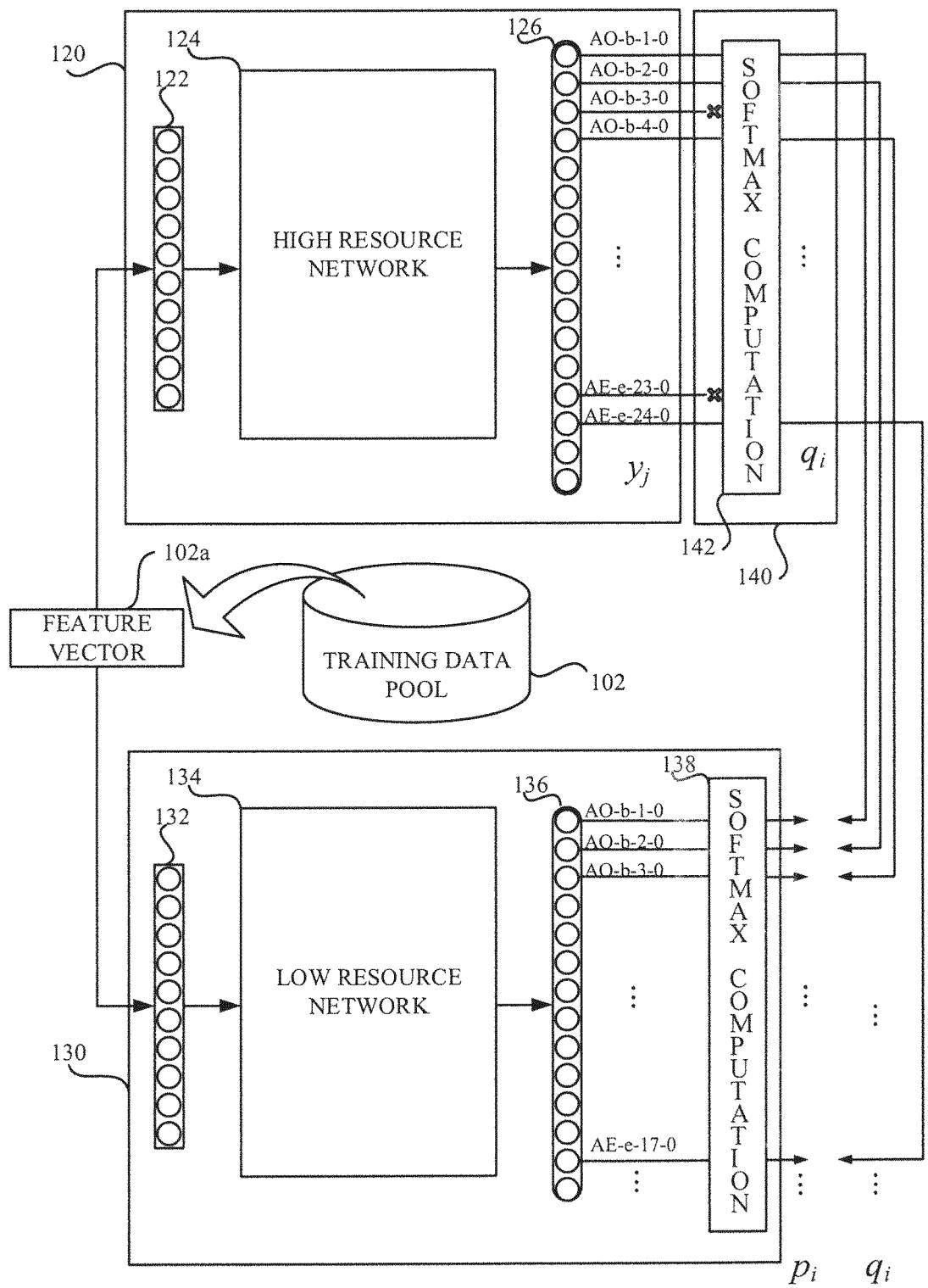
FIG. 6 illustrates a way of converting outputs generated by a teacher model into soft labels used for training a student model, and a way of comparing the soft labels with outputs of the student model during the knowledge distillation process, according to an exemplary embodiment of the present invention.

FIG. 6 describes a way of converting the outputs $y_j$ generated by the teacher model 120 into the soft labels used for training the student model 130. As shown in FIG. 6, the teacher model 120 has an input layer 122 for receiving a feature vector 102a, a high resource network 124 and an output layer 126 before softmax computation. The student model 130 has an input layer 132 for receiving a feature vector 102a, a low resource network 134, an output layer 136 before softmax computation and a softmax computation 138. Note that the softmax computation 138 is described as a subsequent layer separated from the output layer 136 in FIG. 6, for the purpose of illustration.

As shown in FIG. 6, the soft label convertor 140 includes a softmax computation 142 for teacher side that convers from the outputs $y_j$ for the teacher side class set J into the soft label $q_i$ for the student side class set I based on the aforementioned softmax function. Note that not all of outputs obtained from the teacher model 120 but a part of outputs mapped to the student model 130 are used to compute the softmax. Also note that one output obtained from the teacher model 120 may be mapped to plural classes for the student side class set I.

Referring back to FIG. 5, at step S107, the processing circuitry may determine whether there is still any unprocessed data in the training data pool 102. In response to determining that there is at least one data to be processed in the training data pool 102 at the step S107, the process may loop back to step S105 for further iterations. In response to determining that there is no unprocessed data in the training data pool 102, the process may proceed to step S108.

At step S108, the processing circuitry may train the student model 130 by the knowledge distillation technique using the soft labels and optionally hard labels for each input feature vector. During the training, the processing circuitry may pick a feature vector 102a from the training data pool 102 and feed the vector 102a into the student model 130 to obtain a set of outputs $p_i$ for the student side class set. The outputs $p_i$ (i=1, . . . , M) obtained at step S108 are probabilities after the softmax computation, as illustrated in FIG. 6. The soft labels $q_i$ (1, . . . , M) obtained from the teacher model 120 are compared with the output $p_i$ (1, . . . , M) obtained from the student model 130. FIG. 6 further describes a way of comparing the soft labels $q_i$ with the outputs $p_i$ of the student model 130 during the training of the knowledge distillation.

In a particular embodiment, a cost function used for training the student model 130 is represented as follow:

$$\mathcal{L}(\theta) = -\sum_i q_i \log p_i$$

where $q_i$ represents the soft label determined by the confusion matrix 106 for each student side class i, which works as a pseudo label, and $p_i$ represents output probability for each student side class i. In a particular embodiment, the hard label and the soft labels are used alternately to update the parameters of the student model 130 during the training process.

In one embodiment, all of the soft labels calculated for each training input are used to train the student model 130. Alternatively, in other embodiment, merely at least a part of the set of the soft labels calculated for each training input is used to train the student model 130. For example, posterior probabilities of top K most likely class labels in $q_i$ are used to train the student model 130 after the top K class labels from the teacher model 120 are normalized so that the sum of the top K equals to 1. This normalization may be performed after the softmax computation.

Also, it is described that a feature vector 102a that is same as that fed into the teacher model 120 is fed into the student model 130 during the training process. However, the input feature vector to be fed into the student model 130 may not be necessary to be same as that fed into the teacher model 120. In a particular embodiment, the input layer 122 of the teacher model 120 may be different from the input layer 132 of the student model 130 in sizes (i.e., the number of the frames) and acoustic features. Thus, a feature vector that shares the same central frame with a feature vector for the teacher model 120 and that originates from the same speech data as that generates this feature vector for the teacher model 120 may be fed into the student model 130 during the training process.

Furthermore, parallel data which includes training pairs from the teacher and student domains, respectively, may also be contemplated. For example, a feature vector obtained from a speech signal of an original domain may be used for the teacher model 120 while a different feature vector obtained from a corresponding speech signal of different domain may be used for the student model 130. The speech signal of the different domain can be obtained by replaying the speech signal of the original domain in a different environment, by digitally mixing the speech signal of the original domain with other signal, or by transforming the speech signal of the original domain to simulate a different domain speech signal.

Furthermore, in the described embodiment, it has been described that the soft labels $q_i$ after the softmax computation 142 are compared with the output $p_i$ after the softmax computation 138 to encourage the posterior probabilities of the student model 130 close to those of the teacher model 120. Comparing value after the softmax computation is preferable. However, in other embodiment, comparing the soft labels before the softmax computation 142 with the output before the softmax computation 138 may not be excluded.

After performing the training process at S108, the process may proceed to step S109 and end at the step S109. The parameters of the student model 130, which may include weights between each units and biases of each unit, are optimized during the training of the knowledge distillation process so as to classify the input correctly.

Figure 7:
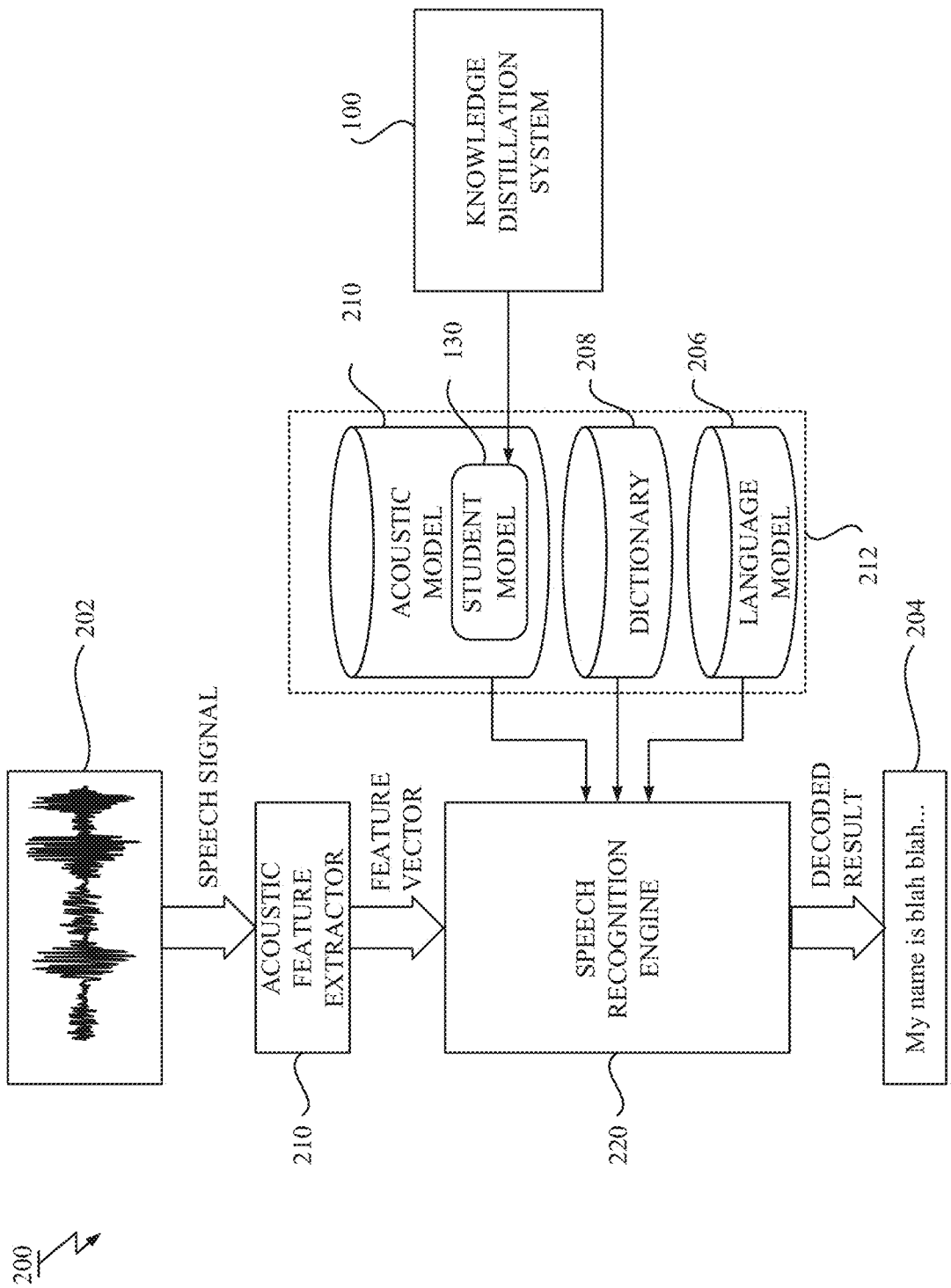
FIG. 7 illustrates a block diagram of a speech recognition system that includes the knowledge distillation system according to the exemplary embodiment of the present invention.

With reference to FIG. 7, an overall picture of a speech recognition system that includes the knowledge distillation system 110 is described.

FIG. 7 illustrates a block diagram of a speech recognition system 200 that includes the knowledge distillation system 100 shown in FIG. 1. As shown in FIG. 7, the speech recognition system 200 may include an acoustic feature extractor 210 that receives speech signals 202 and extracts acoustic features from the received speech signals 202; a speech recognition engine 220 that receives the extracted acoustic features and outputs a decoded result 204 based on given speech recognition models 212; and the knowledge distillation system 100.

The acoustic feature extractor 210 receives the speech signals 202 digitalized by sampling an analog audio input, which may be an input from a microphone for instance, at a predetermined sampling frequency and a predetermined bit depth. The acoustic feature extractor 210 extracts the acoustic features from the received speech signal 202 by any known acoustic feature analysis and then outputs a sequence of frames of the extracted acoustic features. The speech signal may be provided as an audio file, an audio stream from an input device such as a microphone, or an audio stream via a network socket. The acoustic features extracted here may same as those used for generating training data in the training data pool 102.

The speech recognition engine 220 receives the sequence of the extracted acoustic features and predicts most plausible speech contents based on the speech recognition models 212.

The speech recognition models 212 may include a language model 206, a dictionary 208 and an acoustic model 210. The language model 206 is a model representing probability distribution of word sequence and may be, but not limited to, an n-gram model or a neural network based model such as RNN LM (Language Model). The acoustic model 210 is a model representing relationship between input acoustic features and sub-word units constituting a speech. The dictionary 208 describes mappings between each word and corresponding sub-word. Among the speech recognition models 212, the acoustic model 210 may be a target of the novel knowledge distillation according to the exemplary embodiment of the present invention.

As described above, the student model 130 trained by the knowledge distillation system 100 can be used in the acoustic model 210 at least in part. The probability distribution output from the student model 130 can be passed to the HMM after appropriate computation. Alternatively, features extracted from the student model 130 can be passed as an input to a subsequent acoustic model such as a standard GMM/HMM system.

The speech recognition engine 220 finds a word sequence with maximum likelihood based on the sequence of the acoustic features provided from the acoustic feature extractor 210 by integrating the language model 206 and the acoustic model 210, and outputs the word sequence found as the decoded result 204.

In standard knowledge distillation techniques, there is an implicit assumption that components of output layers between the student and the teacher models are same. However, the components of the output layers may be different depending on target environments. In addition, there is a situation where the output layer of the model that has been already built (and released) could not be changed due to practical reason (e.g., updating of already released model). It is quite time-consuming to build both teacher and student models for each acoustic environment.

According to one or more embodiments of the present invention, it is possible to train a student model by leveraging knowledge obtained from a teacher model even though the student model has a class set different from the teacher model. Since a teacher model having a matched class set is not necessary for the knowledge distillation, some of domain specific acoustic models available but with different target layers from the student model can be leveraged, thereby leading that the process time to build the student model is expected to be largely cut down.

Note that the languages to which the novel knowledge distillation technique may be applicable is not limited and such languages may include, by no means limited to, Arabic, Chinese, English, French, German, Japanese, Korean, Portuguese, Russian, Spanish for instance.

Embodiment for Image Recognition

Note that in the embodiments described above, a neural network used for an acoustic model 210 is a target of the novel knowledge distillation. However, since a neural network is one of the most promising models used in a variety of recognition tasks in addition to the speech recognition, any neural network used in other field such as image recognition processing, motion recognition processing, etc., may also be a target of the novel knowledge distillation according to one or more embodiment of the present invention.

Now referring to the series of FIGS. 8 and 9, a knowledge distillation system and process of knowledge distillation for image recognition according to other exemplary embodiment of the present invention will be described. In contrast to the aforementioned embodiments, the teacher and student models are image recognition models and the data unit is image data, which may be a whole or a part of a still image or a frame in a video.

Figure 8:
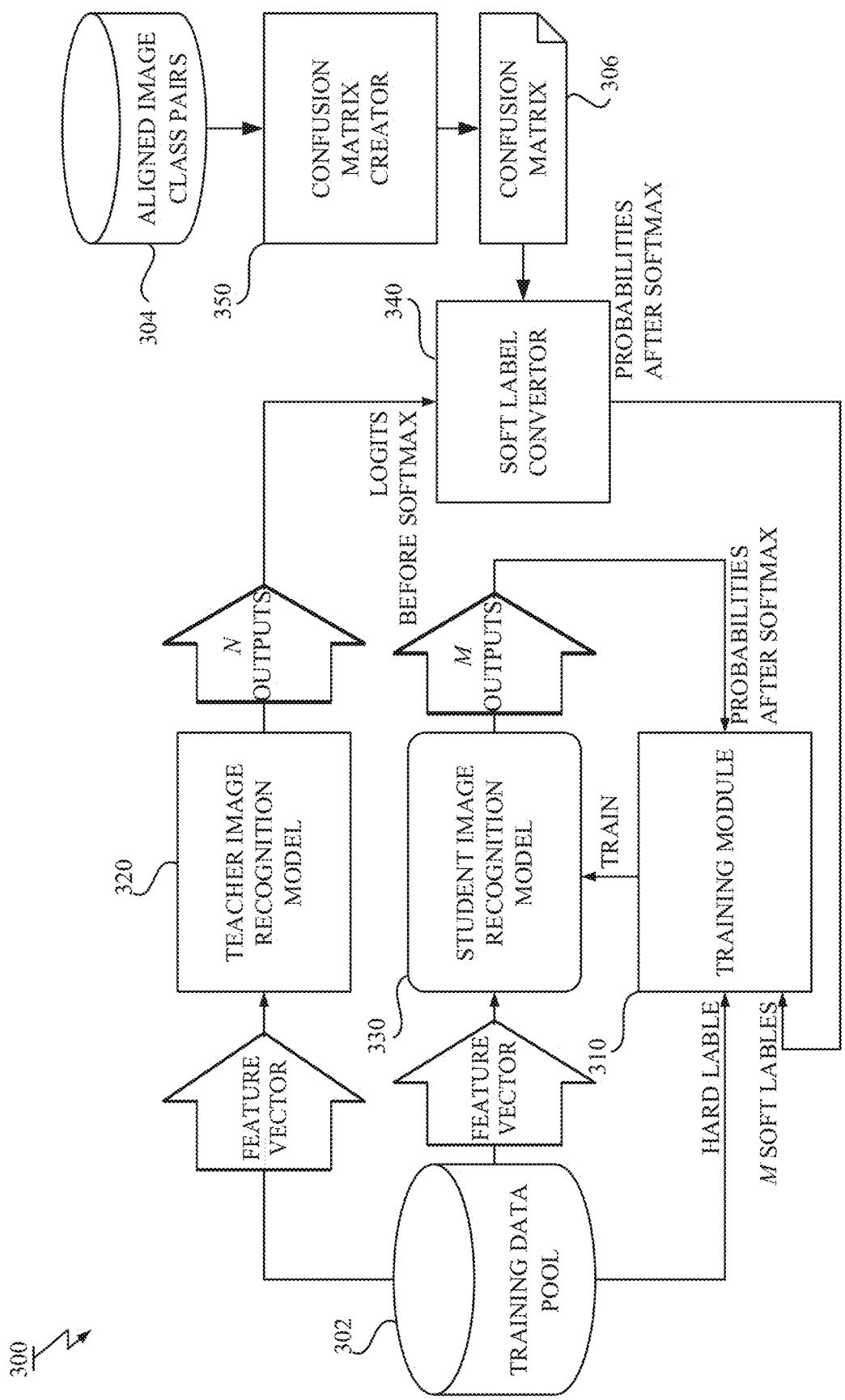
FIG. 8 illustrates a block diagram of a knowledge distillation system for an image recognition according to other exemplary embodiment of the present invention.

FIG. 8 illustrates a block diagram of a knowledge distillation system for the image recognition. As shown in FIG. 8, the knowledge distillation system 300 includes a training module 310; a teacher image recognition model 320; a student image recognition model 330; and a soft label convertor 340. There is further a training data pool 302; a class pair store 304; a confusion matrix creator 350; and a confusion matrix 306.

The image recognition may be a task for classifying the image or pixel into image classes, for examples, /grass/, /sky/, /car/, /cat/ etc. The neural network model for the image recognition typically includes an input layer that receives an image block; one or more hidden layers processes the image block; and an output layer that outputs a probability distribution over image classes based on activations of the hidden layers.

In the knowledge distillation system 300 shown in FIG. 8, the teacher image recognition model 320 has N image classes as the output layer, whereas the student image recognition model 330 has M image classes as the output layer. Hereinafter, the set of the N image classes for the teacher image recognition model 320 is referred to as a teacher side class set and the set of the M image classes for the student image recognition model 330 is referred to as a student side class set, as similar to the aforementioned embodiments.

The teacher image recognition model 320 is typically a high resource classification model, which includes a single model or an ensemble of plural models. The student image recognition model 330 is typically a lightweight compact classification model. Any one of standard neural networks can be used for the teacher and student models 320, 330. The student side class set is different from the teacher side class set at least partially in members.

The class pair store 304 is configured to store a collection of class pairs labelled to respective image blocks. The images collected to generate the class pairs may include any image obtained by shooting a video or stilling a picture that captures any real world objects in a view of a camera device. The images collected for the class pairs may also include any images drawn by the human or generated by the computer graphics.

Figure 9:
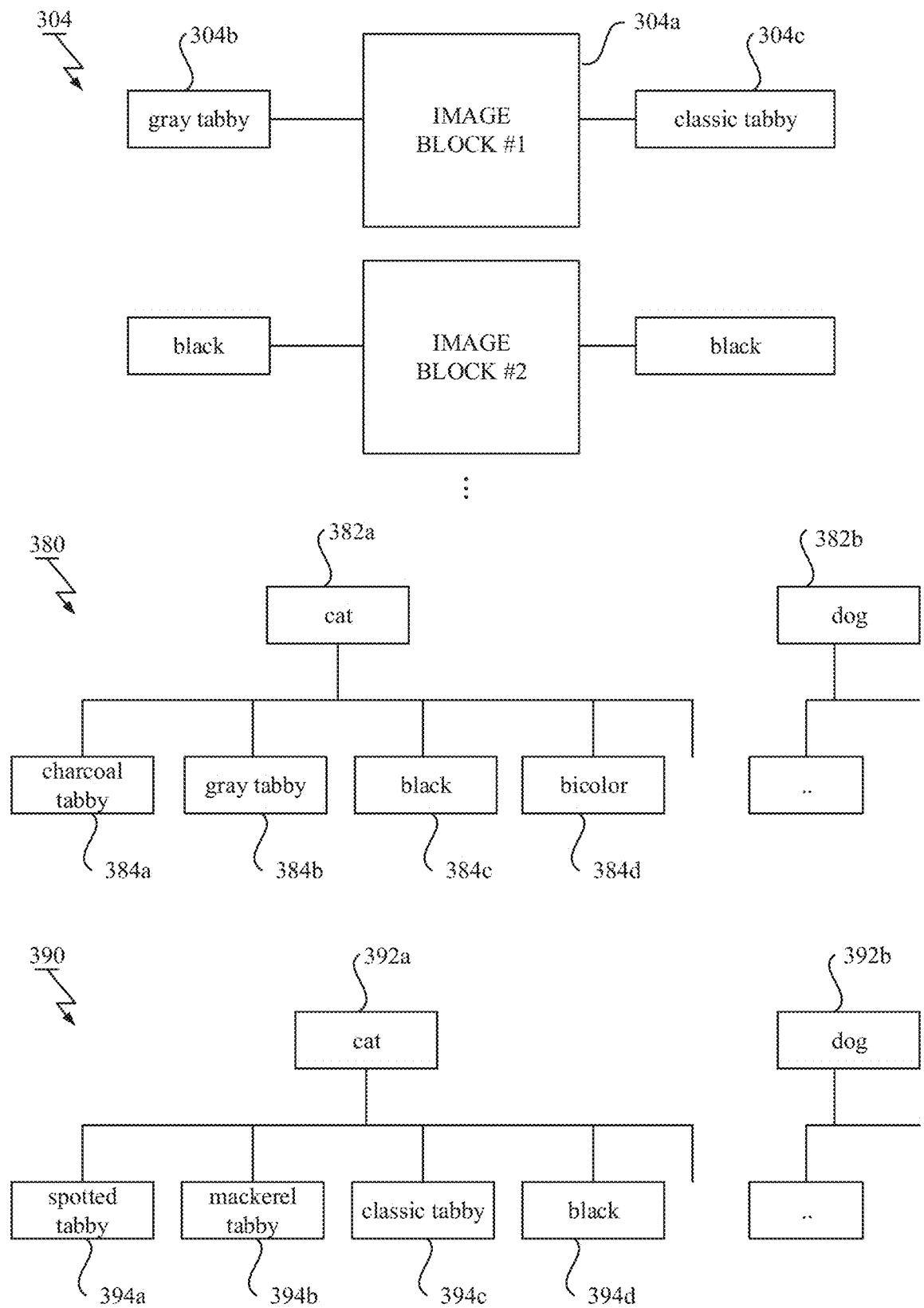
FIG. 9 describes a data structure of a class pair of teacher side and student side classes for the image recognition and hierarchies for teacher side and student side class sets according to the other exemplary embodiment of the present invention.

FIG. 9 describes a data structure of a class pair of teacher and student side classes for the image recognition. As shown in FIG. 9, each image block 304a is labeled parallelly with a correct image class "gray tabby" 304b that is selected from among the teacher side class set 380 and a correct image class "classic tabby" 304c that is selected from among the student side class set 390.

The confusion matrix creator 350 is configured to create a confusion matrix 306 based on the collection of the parallelly labeled class pairs stored in the class pair store 304. The confusion matrix 306 is used by the soft label convertor 340 in calculating the soft labels. The confusion matrix creator 350 has a similar data structure shown in FIG. 4.

The knowledge distillation system 300 prepares the teacher image recognition model 320 having the teacher side class set that has been already trained. The knowledge distillation system 300 also prepares the student image recognition model 330 to be trained and the training data pool 302 to be used. Then, the knowledge distillation system 300 performs the process of the knowledge distillation to train the student image recognition model 330 by cooperating the training module 310, the teacher image recognition model 320 and the soft label convertor 340 with training data stored in the training data pool 302.

The training data pool 302 is configured to store a collection of training data, each of which includes a training input and a hard label. The training input is a feature vector that may be derived from an image block with a predetermined window size. The hard label given for each feature vector may indicates one of the student side class set labelled to an image block or pixel corresponding to the feature vector.

A feature vector retrieved from the training data pool 302 is fed into the teacher image recognition model 320 to produce a set of outputs for the teacher side class set. The obtained set of the outputs for the teacher side class set is then fed into the soft label convertor 340 to convert into a set of soft labels for the student side class set.

The soft label convertor 340 is configured to calculate a set of soft labels for the student side class set from the set of the outputs obtained from the teacher model 120 by using the confusion matrix 306. The soft label convertor 340 uses at least an output obtained for a class within a subset of the teacher side class set that has relevance to the corresponding member of the student side class set, for each member of the student side class set.

In the described embodiment, a teacher side class that is most frequently observed in the collection together with the corresponding student side member is selected and an output for this teacher side class is used for calculating a soft label for the student side member. The class used for each student side member may be limited within the subset of the teacher side class set that has relevance to the student side member. In the image recognition, the relevance may mean sharing superclass in the hierarchical structure of the class sets.

FIG. 9 also describes a hierarchy for teacher side and student side class sets 380, 390. In a particular embodiment, the subset is limited to classes sharing the same superclass 382a, 392a (e.g., "cat"). For example, there are several sub-classes 384 (e.g., a "charcoal tabby" class 384a, a "gray tabby" class 384b, a "black" class 384c and a "bicolor" class 384d) under one superclass 382a (e.g., "cat") in the hierarchy for the teacher side class set 380. On the other hand, there also are several sub-classes 394 (e.g., a "spotted tabby" class 394a, a "mackerel tabby" class 394b, a "classic tabby" class 394c and a "black" class 394d) under one superclass 392a (e.g., cat) in the hierarchy for the student side class set 390. The subset of the teacher side class set belonging to the superclass 392a (e.g. cat) is different from a relevant subset belonging to the same superclass (e.g. cat) of the student side class set at least partially in members.

Referring back to FIG. 9, the training input is fed into the teacher image recognition model 320 for each training data in the training data pool 302. Then, a set of soft labels for the student side class set is calculated for each training data based on the outputs from the teacher image recognition model 320. Thus, a collection of training examples, each of which includes a feature vector, a hard label and soft labels, is prepared for the knowledge distillation.

The training module 310 is configured to train the student image recognition model 330 using the teacher image recognition model 320 in a framework of knowledge distillation. After obtaining sufficient amount of the training examples, the training module 310 initiates training of the student image recognition model 330 using at least a part of the soft labels calculated for each training data. In the knowledge distillation, at least soft labels calculated by feeding the feature vector are used. Optionally, the hard labels given for the training data can also be used. The student image recognition model 330 finally obtained after the training by the training module 310 may be used to compute observation probability distribution over image classes for a given input image block.

In particular embodiments, each of modules 310, 320, 330, 340 and 350 of the knowledge distillation system 300 described in FIG. 8 may be, but not limited to, implemented as a software module in conjunction with hardware components; as a hardware module including electronic circuitry; or as a combination thereof. These modules 310, 320, 330, 340 and 350 described in FIG. 8 may be implemented on a single computer system or a computer system distributed over a plurality of computing devices. The process for generating soft labels used for training an image recognition model is almost same as that shown in FIG. 5 except for the processes related to the forced alignment (i.e., S101, S102) and a limitation for the subset.

In the image recognition system, the components of the output layers may also be different depending on environments. However, according to one or more embodiments of the present invention, it is possible to train a student model having different image class set from a teacher model, thereby leading that the process time to build the student model is expected to be largely cut down.

Experimental Study

A program implementing the knowledge distillation system and knowledge distillation process described with reference to the series of FIGS. 1-6 according to the exemplary embodiment was coded and executed.

A VGG model having 9.3 k context dependent phoneme classes in the output layer was prepared as a teacher model. The VGG teacher model included 10 convolutional layers, with a max-pooling layer inserted after every 3 convolutional layers, followed by 4 fully connected layers. All hidden layers had ReLU non-linearity. Batch normalization was applied to the fully connected layers. The VGG teacher model was trained using 500 hours of generic speech data in English.

A CNN model including an input layer, convolutional and max pooling layers, fully-connected layers and output layer was prepared as a student model. The number of the convolutional layers was 2. The numbers of the localized filters in the convolutional layers were 128 and 256, respectively. The fully-connected layers in the neural network included 4 hidden layers of 1024 hidden units. The number of units in the output layer of the neural network was almost 7000. Each unit in the output layer corresponded to each quinphone HMM state.

15 hours of noisy speech data with manual transcriptions that is so-called Aurora-4 were prepared to create the confusion matrix and to train the student model.

11 consecutive frames of Log Mel features having 40 frequency banks and its dynamic features (delta and delta-delta features) were used as input. A class label was aligned to each center frame by the forced alignment technique based on standard GMM/HHM to generate a collection of training data.

Class label pairs were aligned to respective frames by the forced alignment technique using the VGG teacher model t and a trained standard GMM/HHM model with a 7 k class set, respectively. The confusion matrix was created based on the collection of the class label pairs prepared. Each training input in the collection of the training data was fed into the VGG teacher model followed by the soft label convertor to generate soft labels using the created confusion matrix under several conditions. There were three conditions including an unrestricted condition (corresponding to "any state" condition 106e in FIG. 4), a phoneme shared condition (corresponding to "same central phoneme" condition 106f in FIG. 4), a state shared condition corresponding to "same central phoneme and sub-state" condition 106g in FIG. 4).

The student models initialized with random parameters were trained with a stochastic gradient descent approach by using the hard label and the soft labels alternately. The posterior probabilities of top K most likely class labels were used to train the student model after normalization. This normalization was performed after the softmax computation.

As for an comparative example (Comparative Examples 1 & 2), a baseline 7 k CNN model and a 9.3 k CNN model were trained by using the training speech data. As for other comparative example (Comparative Example 3), a 9.3 k CNN model was trained by using a hard label and soft labels generated from the 9.3 k VGG teacher model in a standard knowledge distillation framework with the same context dependent phonemes. This model is referred to as a "baseline 9.3 k CNN student model". As for further other comparative example (Comparative Example 4), a 7 k CNN student model was trained by using a hard label and soft labels that were obtained from the 9.3 k VGG teacher model, in which the unrestricted condition (104e in FIG. 4) that did not limit to any subset was employed.

As for an example (Example 1), a 7 k CNN student model was trained by using a hard label and soft labels that were generated from the 9.3 k VGG teacher model by the novel knowledge distillation, in which the phoneme shared condition (106f in FIG. 4) that limits to a subset sharing the central phoneme was employed. As for other example (Example 2), a 7 k CNN student model was trained by using a hard label and soft labels that were generated from the 9.3 k VGG teacher model by the novel knowledge distillation, in which the sub-state shared condition (106g in FIG. 4) that limits to a subset sharing both the central phoneme and sub-state was employed.

In the examples and the comparative examples, after the training of the neural network was completed, the neural network from the input layer to the output layer was stored. The accuracy of the speech recognition systems that incorporated the obtained neural network as an acoustic model was evaluated for each of the examples and the comparative examples by using several test data sets. The test data set including "clean" and "noisy" data in the Aurora-4 data set were used. WER (Word Error Rate) was utilized as ASR accuracy metric.

Unless otherwise noted, any portions of the speech recognition model except for way of training the acoustic model were approximately identical between the examples and the comparative examples. The final topologies of the CNN model in the examples were identical to that of the comparative examples except for the output layer.

The evaluated results of the examples and the comparative examples and the reference performance of the VGG teacher model are summarized as follows:

| | | Test Condition | | | | |
| | | wv1 (matched channel condition) | | wv2 (mismatched channel condition) | | |
| Acoustic Model | Target | Clean | Noisy | Clean | Noisy | AVG |
| --- | --- | --- | --- | --- | --- | --- |
| Comparative Example 1 (baseline 7k CNN model) | hard label | 3.8 | 7.2 | 6.5 | 15.5 | 10.4 |
| Comparative Example 2 (baseline 9.3k CNN model) | hard label | 3.8 | 7.7 | 6.6 | 16.0 | 10.9 |
| Reference (9.3k VGG teacher model) | hard label | 4.8 | 8.4 | 6.2 | 14.3 | 10.5 |
| Comparative Example 3 (baseline 9.3k CNN student model) | soft and hard labels | 3.4 | 6.5 | 5.5 | 13.6 | 9.2 |
| Comparative Example 4 (7k CNN student model: any state) | soft and hard labels | 4.8 | 68.3 | 14.2 | 75.1 | 62.8 |
| Example 1 (7k CNN student model: same central phoneme) | soft and hard labels | 3.1 | 6.7 | 5.4 | 13.8 | 9.4 |
| Example 2 (7k CNN student model: same central phoneme and sub-state) | soft and hard labels | 3.2 | 6.7 | 5.6 | 13.7 | 9.4 |

As shown in the aforementioned table, the baseline CNN models showed 10.4% (Comparative Example 1) and 10.9% (Comparative Example 2) WER for average. The VGG teacher model showed 10.5% WER for average. The baseline 9.3 k CNN student model trained by the standard knowledge distillation (Comparative Example 3) showed 9.2% WER for average, which outperformed the baseline 9.3 k CNN model (Comparative Example 2). The 7 k CNN student model trained under the unrestricted condition (any state) (Comparative Example 4) showed 62.8% WER for average, which underperformed the baseline 7 k CNN model (Comparative Example 1).

In contrast, the 7 k CNN student models trained with the different context dependent phonemes under restricted conditions (the phoneme shared condition (Example 1) and the sub-state shared condition (Example 2)) showed 9.4% and 9.4% WER for average, which outperformed the baseline 7 k CNN model (Comparative Example 1). Note that approximately 7% of the context dependent phoneme classes were mapped to respective classes not sharing the central phoneme without the limitation. The 7 k CNN student models (Examples 1 & 2) showed the performance comparable with the baseline 9.3 k CNN student model (Comparative Example 3). Note that the 7 k CNN student models (Examples 1 & 2) slightly outperformed the VGG teacher model. It is understood that this is because the VGG teacher model was trained for more generic by using a wide variety of training speech data (not Aurora-4 specific training data), and can be regarded as a complementary model.

It was demonstrated that the neural network model can be trained in the knowledge distillation framework even though the components of the output layers are different. It was confirmed that the speech recognition using the neural network based acoustic model that was trained by the novel knowledge distillation process with an appropriate limitation can outperform the baseline CNN model. The improvement owing from the novel knowledge distillation process was comparable to that obtained by the standard knowledge distillation where the components of the output layers are same.

Computer Hardware Component

Figure 10:
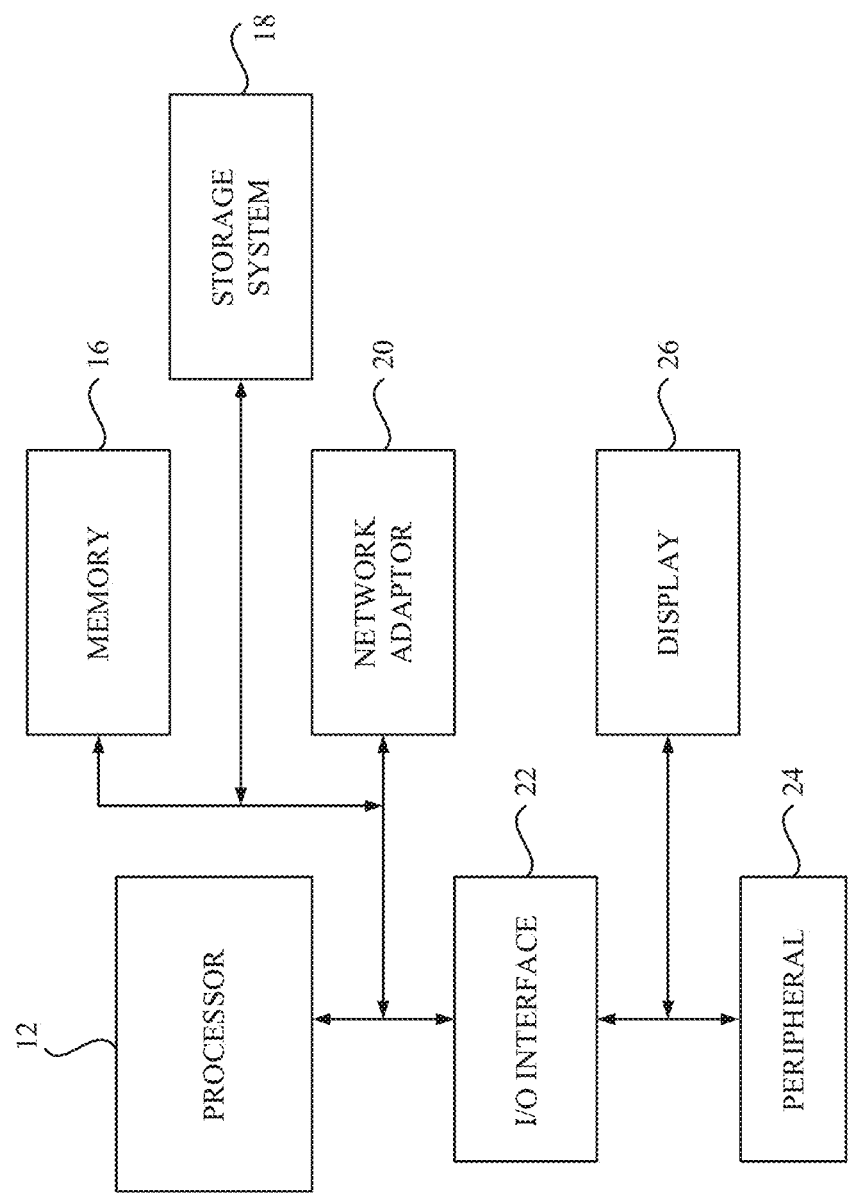
FIG. 10 depicts a schematic of a computer system according to one or more embodiments of the present invention.

Referring now to FIG. 10, a schematic of an example of a computer system 10, which can be used for the knowledge distillation system 100 and/or the speech recognition system 200, is shown. The computer system 10 shown in FIG. 10 is implemented as computer system. The computer system 10 is only one example of a suitable processing device and is not intended to suggest any limitation as to the scope of use or functionality of embodiments of the invention described herein. Regardless, the computer system 10 is capable of being implemented and/or performing any of the functionality set forth hereinabove.

The computer system 10 is operational with numerous other general purpose or special purpose computing system environments or configurations. Examples of well-known computing systems, environments, and/or configurations that may be suitable for use with the computer system 10 include, but are not limited to, personal computer systems, server computer systems, thin clients, thick clients, handheld or laptop devices, in-vehicle devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system 10 may be described in the general context of computer system-executable instructions, such as program modules, being executed by a computer system. Generally, program modules may include routines, programs, objects, components, logic, data structures, and so on that perform particular tasks or implement particular abstract data types.

As shown in FIG. 10, the computer system 10 is shown in the form of a general-purpose computing device. The components of the computer system 10 may include, but are not limited to, a processor (or processing circuitry) 12 and a memory 16 coupled to the processor 12 by a bus including a memory bus or memory controller, and a processor or local bus using any of a variety of bus architectures.

The computer system 10 typically includes a variety of computer system readable media. Such media may be any available media that is accessible by the computer system 10, and it includes both volatile and non-volatile media, removable and non-removable media.

The memory 16 can include computer system readable media in the form of volatile memory, such as random access memory (RAM). The computer system 10 may further include other removable/non-removable, volatile/non-volatile computer system storage media. By way of example only, the storage system 18 can be provided for reading from and writing to a non-removable, non-volatile magnetic media. As will be further depicted and described below, the storage system 18 may include at least one program product having a set (e.g., at least one) of program modules that are configured to carry out the functions of embodiments of the invention.

Program/utility, having a set (at least one) of program modules, may be stored in the storage system 18 by way of example, and not limitation, as well as an operating system, one or more application programs, other program modules, and program data. Each of the operating system, one or more application programs, other program modules, and program data or some combination thereof, may include an implementation of a networking environment. Program modules generally carry out the functions and/or methodologies of embodiments of the invention as described herein.

The computer system 10 may also communicate with one or more peripherals 24 such as a keyboard, a pointing device, a car navigation system, an audio system, etc.; a display 26; one or more devices that enable a user to interact with the computer system 10; and/or any devices (e.g., network card, modem, etc.) that enable the computer system 10 to communicate with one or more other computing devices. Such communication can occur via Input/Output (I/O) interfaces 22. Still yet, the computer system 10 can communicate with one or more networks such as a local area network (LAN), a general wide area network (WAN), and/or a public network (e.g., the Internet) via the network adapter 20. As depicted, the network adapter 20 communicates with the other components of the computer system 10 via bus. It should be understood that although not shown, other hardware and/or software components could be used in conjunction with the computer system 10. Examples, include, but are not limited to: microcode, device drivers, redundant processing units, external disk drive arrays, RAID systems, tape drives, and data archival storage systems, etc.

Computer Program Implementation

The present invention may be a computer system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more aspects of the present invention has been presented for purposes of illustration and description, but is not intended to be exhaustive or limited to the invention in the form disclosed.

Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for generating soft labels for training, the method comprising:
preparing a teacher model having a teacher side class set;
obtaining a collection of class pairs for respective data units, each class pair including class labels with classes labeled to a corresponding data unit from among the teacher side class set and from among a student side class set different from the teacher side class set, the class labels including characters representing a center phoneme, a sub-state, and a class number;
feeding a training input into the teacher model to obtain a set of outputs for the teacher side class set; and
calculating a set of soft labels for the student side class set from the set of the outputs by using, for each member of the student side class set, at least an output obtained for a class within a subset of the teacher side class set having relevance to the member of the student side class set, based at least in part on observations in the collection of the class pairs,
wherein the subset of the teacher side class set for each member of the student side class set includes one or more classes having a center phoneme and a sub-state same as the members of the student side class set.

2. The method of claim 1, wherein calculating the set of soft labels for the student side class set comprises:
selecting, for each member of the student side class set, a class most frequently observed in the collection together with the member of the student side class set from among the subset.

3. The method of claim 2, wherein a class of the subset most frequently observed in the collection together with the member is selected and mapped to the member of the student side class set, the output for the most frequently observed class being used to calculate a soft label corresponding to the member by using softmax function.

4. The method of claim 1, wherein the method further comprises:
creating a data structure summarizing, for each member of the student side class set, a distribution of observations in the collection over at least classes of the subset of the teacher side class set observed together with the member of the student side class set, the data structure being used in calculating the set of the soft labels.

5. The method of claim 1, wherein obtaining the collection of the class pairs for the respective data units comprises:
preparing a trained model having a class set same as the student side class set;
aligning a class to each data unit from among the student side class set by using the trained model; and
aligning a class to each data unit from among the teacher side class set by using the teacher model or other model having a class set same as the teacher side class set.

6. The method of claim 1, wherein the training input is fed into the teacher model for each training data in a pool and the set of the soft labels for the student side class set is calculated for each training data in the pool.

7. The method of claim 6, wherein the method further comprises:
training a student model having the student side class set by using at least a part of the soft labels calculated for each training input.

8. The method of claim 1, wherein the teacher side class set is a class set of phonetic units having N (N is a positive integer) classes, the student side class set is a class set of phonetic units having M (M is a positive integer) classes, the data unit represents a frame in a speech data and the teacher model includes an acoustic model and the student model is a neural network for an acoustic model.

9. The method of claim 8, wherein the M classes in the student side class set belong to a phoneme system of a language same as the N classes in the teacher side class set.

10. The method of claim 1, wherein the teacher side class set is an image class set having N (N is a positive integer) image classes, the student side class set is an image class set having M(M is a positive integer) image classes, the data unit represents an image data, and the teacher model includes an image recognition model.

11. The method of claim 10, wherein the subset of the teacher side class set for each member of the student side class set includes one or more classes belonging to a superclass related to the member of the student side class set.

12. The method of claim 1, further comprising:
mapping pairs between the student side class and the teacher side class, the mapping pairs being determined by identifying a highest count within the subset of the teacher side class set in a generated confusion matrix.

13. A computer system for generating soft s for training, the computer system comprising:
a memory storing program instructions;
a processing circuitry in communications with the memory for executing the program instructions, wherein the processing circuitry is configured to:
prepare a teacher model having a teacher side class set;
obtain a collection of class pairs for respective data units, wherein each class pair includes class labels with classes labelled to a corresponding data unit from among the teacher side class set and from among a student side class set different from the teacher side class set, the class labels including characters representing a center phoneme, a sub-state, and a class number;
feed a training input into the teacher model to obtain a set of outputs for teacher side class set; and
calculate a set of soft labels for the student side class set from the set of the outputs by using, for each member of the student side class set, at least an output obtained for a class within a subset of the teacher side class set having relevance to the member of the student side class set, based at least in part on observations in the collection of the class pairs,
wherein the subset of the teacher side class set for each member of the student side class set includes one or more classes having a center phoneme and a sub-state same as the members of the student side class set.

14. The computer system of claim 13, wherein the processing circuitry is further configured to:
select, for each member of the student side class set, a class most frequently observed in the collection together with the member of the student side class set from among the subset to calculate the set of soft labels for the student side class set.

15. The computer system of claim 13, wherein the processing circuitry is further configured to:
create a data structure summarizing, for each member of the student side class set, a distribution of observations in the collection over at least classes of the subset of the teacher side class set together with the member of the student side class set, wherein the data structure is used to calculate the set of the soft labels.

16. The computer system of claim 13, wherein the processing circuitry is further configured to:

prepare a trained model having a class set same as the student side class set;

align a class to each data unit from among the student side class set by using the trained model as one for each class pair; and align a class to each data unit from among the teacher side class set by using the teacher model or other model having a class set same as the teacher side class set as other for each class pair.

17. A computer program product for generating soft labels for training, the computer program product comprising a computer readable storage medium having program instructions embodied therewith, the program instructions executable by a computer to cause the computer to perform a method comprising:

preparing a teacher model having a teacher side class set;

obtaining a collection of class pairs for respective data units, each class pair including class labels with classes labelled to a corresponding data unit from among the teacher side class set and from among a student side class set different from the teacher side class set, the class labels including characters representing a center phoneme, a sub-state, and a class number;

feeding a training input into the teacher model to obtain a set of outputs for the teacher side class set; and calculating a set of soft labels for the student side class set from the set of the outputs by using, for each member of the student side class set, at least an output obtained for a class within a subset of the teacher side class set having relevance to the member of the student side class set, based at least in part on observations in the collection of the class pairs, wherein the subset of the teacher side class set for each member of the student side class set includes one or more classes having a center phoneme and a sub-state same as the members of the student side class set.

18. The computer program product of claim 17, wherein the method further comprises:

creating a data structure summarizing, for each member of the student side class set, a distribution of observations in the collection over at least classes of the subset of the teacher side class set together with the member of the student side class set, the data structure being used in calculating the set of the soft labels.

19. The computer program product of claim 17, wherein obtaining the collection of the class pairs for the respective data units comprises:

preparing a trained model having a class set same as the student side class set;

aligning a class to each data unit from among the student side class set by using the trained model; and aligning a class to each data unit from among the teacher side class set by using the teacher model or other model having a class set same as the teacher side class set.

* * * * *